United States Patent [19]

Schuster et al.

[11] Patent Number: 5,050,930
[45] Date of Patent: Sep. 24, 1991

[54] LORDOSIS-SUPPORT BACKREST FOR A VEHICLE SEAT

[76] Inventors: Wilhelm Schuster, Neubauzeile 87, A-4030 Linz; Wilhelm Schuster, Jr., Zinngiessing 3, A-4210 Gallneukirchen, both of Austria

[21] Appl. No.: 562,088

[22] Filed: Aug. 3, 1990

[30] Foreign Application Priority Data

Aug. 4, 1989 [AT] Austria .................................. 1882/89

[51] Int. Cl.$^5$ ............................................ A47C 25/00
[52] U.S. Cl. .................................................... 257/284
[58] Field of Search ................................ 297/284, 460

[56] References Cited

U.S. PATENT DOCUMENTS

| 4,452,485 | 6/1984 | Schuster | 297/284 |
| 4,469,374 | 9/1984 | Kashihara et al. | 297/284 |
| 4,632,454 | 12/1986 | Naert | 297/284 |
| 4,697,848 | 10/1987 | Hattori et al. | 297/284 X |
| 4,880,271 | 11/1989 | Graves | 297/284 |
| 4,896,918 | 1/1990 | Hoshihara | 297/284 |
| 4,915,448 | 4/1990 | Morgenstern | 297/284 |
| 4,924,162 | 5/1990 | Sakamoto et al. | 297/284 X |
| 4,968,093 | 11/1990 | DalMonte | 297/284 |

Primary Examiner—Peter A. Aschenbrenner
Attorney, Agent, or Firm—Herbert Dubno

[57] ABSTRACT

A lordosis-support backrest for an automotive vehicle has a pressure element mounted upon vertical wires affixed to the frame of the backrest and guided along these wires. A transmission on the wires driving a rack on the pressure element displaces the pressure element along the wires while a similar transmission affixed to the pressure element at an upper portion thereof has its rack connected by a rocker lever and links to upper and lower portion of the pressure element to control the degree of bulging of the pressure element. The transmissions are driven by flexible shafts connected to respective motors mounted at spaced locations on the frame.

20 Claims, 3 Drawing Sheets

LORDOSIS-SUPPORT BACKREST FOR A VEHICLE SEAT

FIELD OF THE INVENTION

Our present invention relates to a backrest for a vehicle seat and, more particularly, to a lordosis-support backrest.

BACKGROUND OF THE INVENTION

Adjustable backrests capable of providing support for the lower back of a vehicle driver or passenger are known. Such backrests may provide lordosis support and can be adjustable through the use of a cable and may employ a foamed material as a cushioning element and can be adjusted to conform to the contours of the spine.

The known mechanism does not permit any accommodation to the changed or changing spinal column curvature. For example in our long automobile travel, the spinal column curvature alters greatly because of the holding work which necessarily is exerted by the outstretched arms of the driver holding the steering wheel because the total weight of the upper portion of the body under these conditions must be supported in a disadvantageous manner. This muscle and holding work, for supporting the body under conditions of insufficient or improper support, is transmitted fully to the musculature and skeletal system and results in considerable exhaustion and muscle stress. The muscles which are brought into play for this work require up to 40 times as much blood and expend up to 40 times the energy of an upper body with proper anatomical support whose muscles are not subjected to holding work.

The lordosis support must thus be able to adjust well to every spinal column shape and, upon applying full pressure to the back of the user in its adjusted form, should not autogenously alter to ensure that each individual vertebra is fully supported regardless of the curvature.

German patent document DE-OS 34 40 846 discloses, for example, an automobile seat whose backrest comprises a frame and a plate received in the frame. The plate is provided with vertically-extending longitudinal slits in which a lumbar-support device is movable. The lumbar support can be adjusted via a hand wheel through a shaft articulated on the frame to vary its stiffness and to move vertically.

The lumbar support is directly connected with the frame. As a consequence, all vibrations of the vehicle imparted by the road are fully transmitted to the back of the operator.

OBJECTS OF THE INVENTION

It is, therefore, the principal object of the present invention to provide an ergonomically curvable height-adjustable lordosis support in which the apex of the convexity as well as its intensity can be varied so that the overall curvature can conform to the lordosis curvature in the back and the height of the driver.

Another object of this invention is to provide a lordosis-support backrest for a vehicle seat whereby drawbacks of the earlier systems are avoided.

SUMMARY OF THE INVENTION

These objects and others which will become apparent hereinafter are attained, in accordance with the invention, in a lordosis-support backrest for an automotive vehicle which comprises:

a frame;

a plurality or resiliently yieldable substantially vertically extending tension wires connected to the frame;

a selectively deformable and shiftable back-bracing element mounted on the wires for displacement up and down thereon, the back-bracing element comprising:

upper and lower members guided on the wires, flexible means connected between the upper and lower members for bulging toward a person seated on the seat upon movement of the upper and lower members toward one another, a first drive mechanism a rack connected to the back-bracing element and first drive means connected to the rack for displacing the back-bracing element along the guide wires; and a second drive mechanism including a rack displaceable on the back-bracing element, a rocker lever articulated to the rack and respective substantially rigid links connecting spaced-apart locations on the lever with the upper member and the lower member respectively, and second drive means connected with the rack of the second drive mechanism for displacing same to move the upper and lower members apart and together, at least one of the drive means including:

a motor, a flexible shaft connected to and driven by the motor, a transmission including a worm and wormwheel driven by the shaft, and a pinion connected to the transmission and meshing with a respective one of the racks for actuating the respective drive mechanism.

Thus within the frame of the backrest, two or more vertically extending tension wires or springs are connected to the frame, the lordosis support proper, comprising a grid or perforated surface and/or, if desired, other flexible and resilient means engageable with the back of the driver being vertically guided on these tension wires. On the tension wires at the lower portion of the backrest, a first transmission is mounted via clamp elements so as to be nonshiftable on the wires and can have a worm, a wormwheel and a pinion meshing with a first toothed rack which can be connected to the lordosis support element as a whole. This transmission is connected by a flexible or bent shaft with a motor driving the transmission so that the movement of the first rack results in height adjustment of the pressure element as a whole along the tension wires.

The first rack can be traversed at its lower end with a transverse pin connected to the lower member of the pressure element.

An upper strip, sealing off the top of the pressure element, and a support plate forming the bottom of the pressure element and adapted to support the pelvic region, can be separated by spaced-apart transverse ribs and connected by bendable pressure strips.

In the upper region of the pressure element and carried thereby, a second transmission is fixed, preferably to the upper strip and, via a worm, a wormwheel and a pinion, is connected to a second rack movable on a pressure element. This transmission likewise is driven by a flexible shaft from a motor. At a lower portion of the second rack, a substantially horizontally-extending rocker lever is pivotally connected by a pin at one end to the rack.

The opposite end of this lever is connected by a rigid link to an upper portion of the pressure element, preferably the upper strip or to one of the pressure strips. At an intermediate location along its length, the rocker is articulated to a further link which is connected to a lower region of the pressure element, preferably the aforementioned plate. As a consequence, movement of the second rack via the drive supplied by the second motor can vary the curvature of the pressure element with a lever ratio determined by the dimensions of the rocker lever.

According to another feature of the invention, the motors are mounted on opposite sides of the frame and both motors ar connected by respective flexible shafts to the respective transmission. The upper and lower members can be guided by slide elements on the wires and these slide elements may form a snap connection with the wires if desired. The flexible means deformed to follow the shape of the back can be a closed plate to which a bulge shape is imparted, a perforated plate or a grid or plate having a grid pattern of openings thereon.

Clamping means can be provided for detachably and replaceably mounting the transmission on the spring wires and the backrest and the wires above the back bracing element may have a meandering configuration to impart resilience to the wires. Both of the transmissions can be structurally identical.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
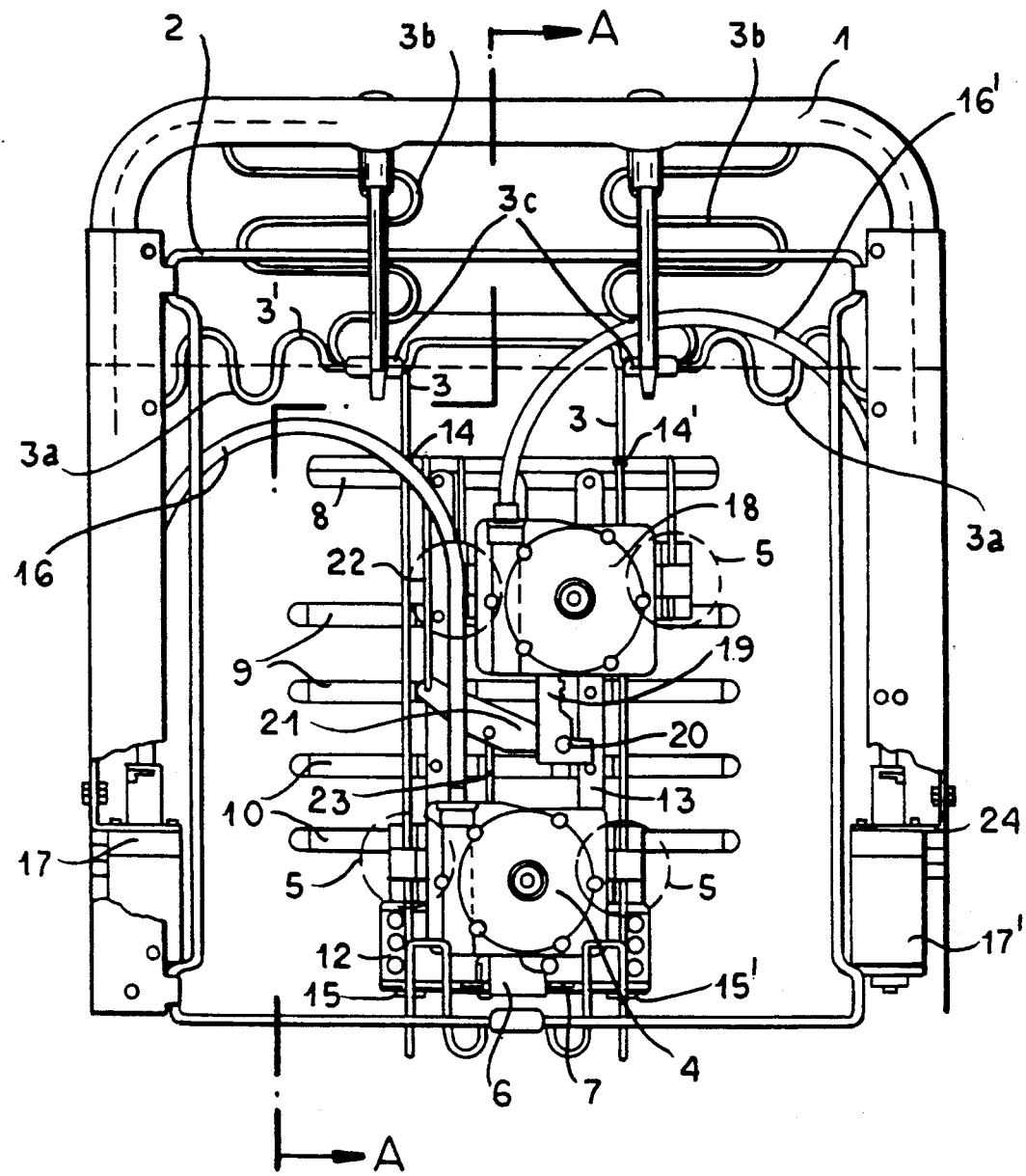
FIG. 1 is a rear view of the lordosis-support backrest of the invention, all upholstery having been removed.
Figure 2:
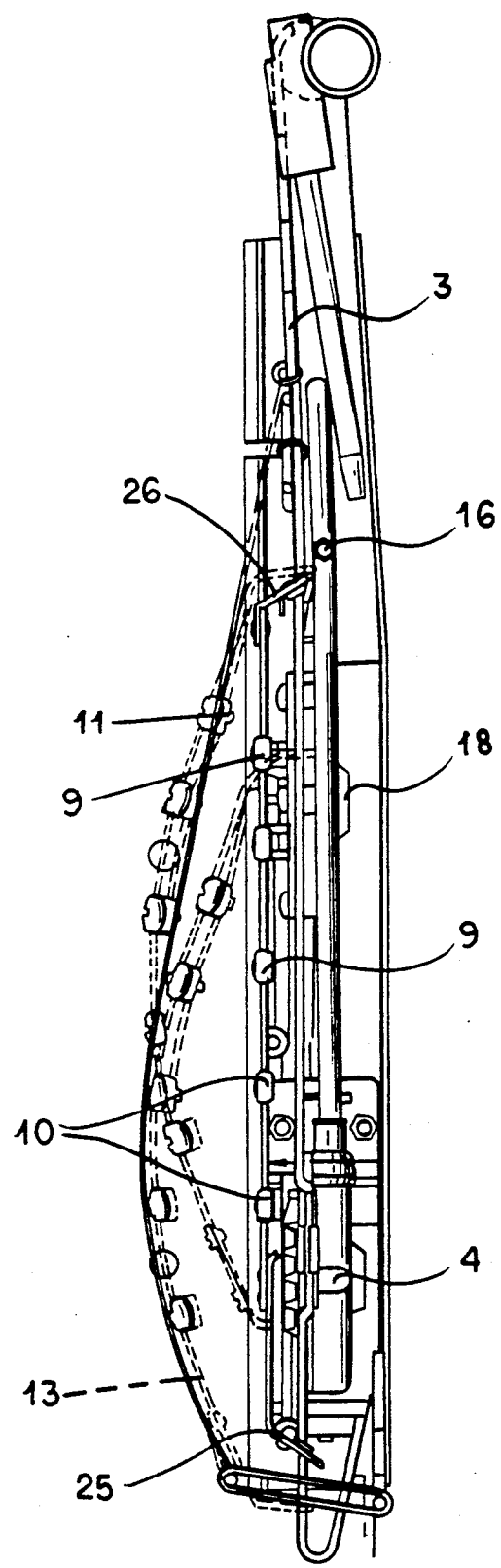
FIG. 2 is a section taken along the line A—A of FIG. 1.

The backrest of the invention comprises a U-shaped downwardly open frame 1 and a frame stirrup 2 received within the frame. The entire frame can be covered with upholstery appropriate to a vehicle seat and not illustrated here.

Within the U-shaped frame, tension wires 3 are disposed and are connected to the frame. As has been shown in FIG. 1 at upper portions of these wires, e.g. at 3a and 3b, meanders can be formed to increase the resiliency. In the embodiment illustrated, the meanders 3b are shown to be integral with the wires 3 while the meanders 3a form parts of additional tension wires which can be clamped to the wires 3 by the sleeve clamps 3c. The wires 3' traverse the frame horizontally and may be parts of a single wire.

At a lower substantially linear region of the two tension wires 3, which may also be offset to accommodate the transmission, a first transmission 4 is affixed by means of clamp elements 5 which permit ready detachment and reattachment of this first transmission. The first transmission 4 has a worm, a wormwheel and a pinion connected to displace a first rack 6.

Figure 3:
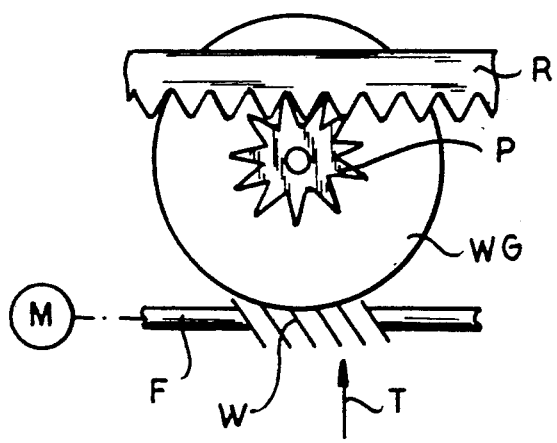
FIG. 3 is a diagram of a transmission for use in the backrest of FIGS. 1 and 2.

By way of example, referring to FIG. 3, it can be seen that the transmission can comprise a worm W driven by the flexible drive shaft F from an electric motor M operated by the electric power source of the vehicle. The wormwheel W meshes with a worm gear WG on a common shaft with a pinion P meshing with the rack R. The worm W, the worm gear WG and the pinion P form the transmission which, in FIG. 3, is represented at T.

The rack 6, corresponding to the rack R, at its lower region is traversed by a transverse shaft 7 or pin connecting it to the pressure element for moving the pressure element upwardly and downwardly along the wires 3. The transmission has a large transmission ratio and thus the adjustment of the position of the lordosis-supporting pressure element can be effected with small drive forces and thus small motor torque. The lordosis pressure element as a whole, therefore, can be shifted along the tension wires 3 which form guide wires for the pressure element.

The lordosis pressure element itself advantageously comprises an upper strip 8 which closes the pressure element from above, spaced-apart mutually parallel transverse ribs, 9, 10, 11 and a support plate 12 in the region of the pelvic edge of the spinal column forming the lower member of this pressure element. These elements are connected by at least two pressure strips 13 which are mutually parallel and ar substantially parallel to the tension wires.

The upper strip and the support plate can be provided with respective pairs of slide eyes 14, 14' and 15, 15' which slidably engage the respective tension wires 3.

The first transmission 4 is connected by a flexible shaft 16 with an electric motor 17, preferably disposed at a lower region of the backrest. Upon energization of this motor, the first transmission 4 is operated to effect height adjustment of the pressure element.

On the upper strip 8, a second transmission 18 is mounted which is preferably identical to the first transmission, can have the same general construction as has been illustrated in FIG. 3, and has a high transmission ratio for its engagement with a second rack 19.

The second transmission 18 is connected with an electric motor 17' by a flexible shaft 16'. The second transmission is fixed to the upper part of the pressure element. Preferably the two transmissions are identical in construction and, because of the low forces to be transmitted, can be composed of plastic members. Both transmissions can be mounted by clamping elements 5 which enable the transmissions to be removed and replaced readily.

Figure 4:
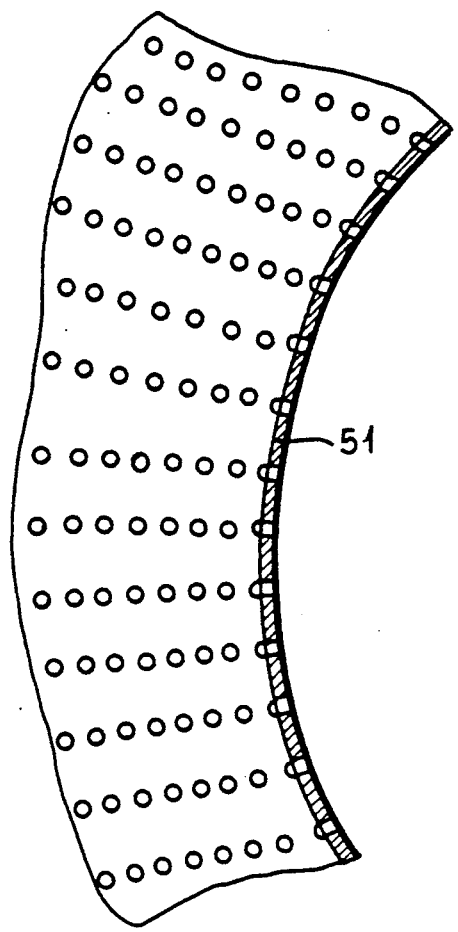
FIGS. 4–6 are views showing fragments of flexible elements which can be deformed by the mechanisms of FIGS. 1 and 2 to provide the requisite bulge.
Figure 5:
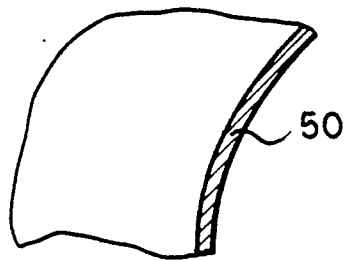
Figure 6:
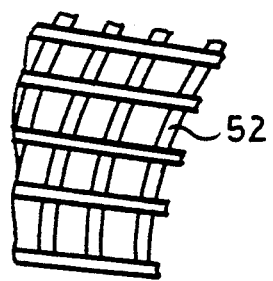

The pressure element need not be constructed as described but can include one or more bulging plates which can be composed of a bendable material, the upper edges of which can be drawn together or spread apart to alter the degree of bulging. When such a plate is used, it can be an unperforated plate as shown at 50 in FIG. 5, a perforated plate as shown at 51 in FIG. 4 or a grid-like plate 52 (FIG. 6).

A rocker lever 21, generally of triangular configuration, is articulated to the lower end of the second rack 19 by a pivot pin 20. The rocker lever is formed with two bores, for example one at its center and another at its end remote from the pivot pin.

As shown in FIG. 1, for example, the left-hand bore of the rocker is connected pivotally by a rigid link 22 with the upper strip 8 while the central bore is connected pivotally by a link 23 with the support plate 12.

The actuation of the second rack 19 thus effects a curvature of the pressure element by varying the distance between the support plate and the upper strip since the links 22 are rigid. Depending upon the curvature and the vertical movement of the pressure element, the location of the apex of the curvature can be moved upwardly or downwardly. The orientation of the rocker lever (from slightly inclined upwardly to slightly inclined downwardly) determines the degree of the bulging of the pressure member. By altering the position of the bores in the rocker lever 21, differing transmission ratios and mechanical advantages can be obtained.

By displacement of the second rack 19, the fulcrum formed by the pivot pin between the second rack and the rocker lever can be displaced. If, for example, the spacing between the bores is equal to the spacing between the intermediate bore and the pivot pin, one of the links will be displaced only half the stroke of the second rocker (halved force equals doubled stroke).

Figure 7:
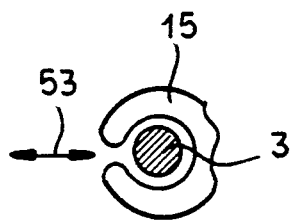
FIG. 7 is a diagram of a snap connection between a guide and a respective spring wire according to the invention.

The four eyes or guides 14, 14', 15, 15' can be slide blocks if desired. Advantageously, however, these eyes may be snap elements as shown for the eye 15 in FIG. 7 in which the eye is open and can snap onto and off of the wire 3 by movement in the direction of the arrow 53. The opening in the eye thus has a generally U shape.

The entire assembly, therefore, can constitute a module which can be mounted in seconds or dismounted or replaced in seconds should repair be necessary. The motors 17 and 17', can, advantageously, be mounted on the frame by fastening brackets 24.

All or some of the elements under tension of the lordosis support can be provided with offset ends 25, 26 or individual spacing elements can be provided to impart a preferred bending direction to the pressure element or this preferred bending direction can be applied by a light prestressing of the elements of the parts of the pressure element.

We claim:

1. A lordosis-support backrest for an automotive vehicle seat, said backrest comprising:
    a frame;
    a plurality of resiliently yieldable substantially vertically extending tension wires connected to said frame;
    a selectively deformable and shiftable back-bracing element mounted on said wires for displacement up and down thereon, said back-bracing element comprising:
        upper and lower members guided on said wires,
        flexible means connected between said upper and lower members for bulging toward a person seated on said seat upon movement of said upper and lower members toward one another,
    a first drive mechanism, a rack connected to said back-bracing element and first drive means connected to said rack for displacing said back-bracing element along said guide wires; and
    a second drive mechanism including a rack displaceable on said back-bracing element, a rocker lever articulated to said rack and respective substantially rigid links connecting spaced-apart locations on said lever with said upper member and said lower member respectively, and second drive means connected with said rack of said second drive mechanism for displacing the same to move said upper and lower members apart and together,
    at least one of said drive means including:
        a motor,
        a flexible shaft connected to and driven by said motor,
        a transmission including a worm and wormwheel driven by said shaft, and
        a pinion connected to said transmission and meshing with a respective one of said racks for actuating the respective drive mechanism.

2. The lordosis-support backrest for an automotive vehicle seat defined in claim 1 wherein each of said drive means includes:
    a respective motor,
    a respective flexible shaft connected to and driven by the respective motor,
    a respective transmission including a worm and wormwheel driven by the respective shaft, and
    a respective pinion connected to the respective transmission and meshing with the respective one of said racks for actuating the respective drive mechanism.

3. The lordosis-support backrest for an automotive vehicle seat defined in claim 2 wherein said motors are mounted on said frame, said transmission of said first drive means is fixedly connected to said wires and said transmission of said second drive means is mounted on said back-bracing element.

4. The lordosis support backrest for an automotive vehicle seat defined in claim 3 wherein said upper and lower members are guided by slide elements on said wires.

5. The lordosis-support backrest for an automotive vehicle seat defined in claim wherein said lower member is connected to said rack of said first drive mechanism by a transverse pin traversing said rack of said first mechanism.

6. The lordosis-support backrest for an automotive vehicle seat defined in claim 5 wherein said flexible means includes:
    an upper strip forming said upper member,
    a support plate forming said lower member,
    a plurality of mutually spaced parallel transverse ribs spaced from said upper strip and said support plate and disposed between them, and
    at least two bendable pressure strips extending parallel to said wires and connected to said upper strip, to said plate and to said transverse ribs.

7. The lordosis-support backrest for an automotive vehicle seat defined in claim 6, further comprising clamping elements connected said transmission of said first drive means with said wires.

8. The lordosis-support backrest for an automotive vehicle seat defined in claim 7 wherein said rocker lever is articulated to said rack of said second drive mechanism at one end of said rocker lever, is connected by one of said links at an opposite end of said rocker lever to said upper strip, and is connected by the other of said links at an intermediate location along the length of the rocker lever to said plate.

9. The lordosis-support backrest for an automotive vehicle seat defined in claim 1 wherein said flexible means includes a plate to which a bulge shape is imparted 10. The lordosis-support backrest for an automotive vehicle seat defined in claim 9 wherein said plate is a closed plate.

11. The lordosis-support backrest for an automotive vehicle seat defined in claim 9 wherein said plate is a perforated plate.

12. The lordosis-support backrest for an automotive vehicle seat defined in claim 9 wherein said plate is a plate having a grid pattern of openings therein.

13. The lordosis-support backrest for an automotive vehicle seat defined in claim 1 wherein said rocker lever forms force reducer.

14. The lordosis-support backrest for an automotive vehicle seat defined in claim 2, further comprising clamping means for detachably and replaceable mounting said transmissions on said backrest.

15. The lordosis-support backrest for an automotive vehicle seat defined in claim 4 wherein said slide elements are eyes.

16. The lordosis-support backrest for an automotive vehicle seat defined in claim 15 wherein said eyes are open and are constricted toward respective openings to form snap elements snappingly engageable with said wires.

17. The lordosis-support backrest for an automotive vehicle seat defined in claim 1 wherein said wires above said back-bracing element have meander shapes.

18. The lordosis-support backrest for an automotive vehicle seat defined in claim 2 wherein both of said drive means are structurally identical.

19. The lordosis-support backrest for an automotive vehicle seat defined in claim 2 wherein said motors are disposed at different locations on said frame.

20. The lordosis-support backrest for an automotive vehicle seat defined in claim 2 wherein the transmissions are composed of plastic, pressed material die-cast metal or sheet metal.

* * * * *